(12) United States Patent
Chen et al.

(10) Patent No.: US 9,883,205 B2
(45) Date of Patent: Jan. 30, 2018

(54) METHOD OF INTER-VIEW RESIDUAL PREDICTION WITH REDUCED COMPLEXITY IN THREE-DIMENSIONAL VIDEO CODING

(71) Applicant: HFI Innovation Inc., Zhubei, Hsinchu County (TW)

(72) Inventors: Yi-Wen Chen, Taichung (TW); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 237 days.

(21) Appl. No.: 14/767,459

(22) PCT Filed: Jun. 11, 2014

(86) PCT No.: PCT/CN2014/079683
§ 371 (c)(1),
(2) Date: Aug. 12, 2015

(87) PCT Pub. No.: WO2014/198222
PCT Pub. Date: Dec. 18, 2014

(65) Prior Publication Data
US 2015/0382020 A1    Dec. 31, 2015

Related U.S. Application Data

(60) Provisional application No. 61/921,147, filed on Dec. 27, 2013, provisional application No. 61/833,747, filed on Jun. 11, 2013.

(51) Int. Cl.
*H04N 19/597* (2014.01)
*H04N 19/513* (2014.01)
(Continued)

(52) U.S. Cl.
CPC .......... *H04N 19/597* (2014.11); *H04N 19/00* (2013.01); *H04N 19/51* (2014.11); *H04N 19/513* (2014.11);
(Continued)

(58) Field of Classification Search
CPC .. H04N 19/597; H04N 19/513; H04N 19/433; H04N 19/00; H04N 19/51
(Continued)

(56) References Cited

U.S. PATENT DOCUMENTS

2007/0286284 A1    12/2007  Ito et al.
2014/0161189 A1*    6/2014  Zhang .................. H04N 19/597
                                                     375/240.16
2014/0253681 A1*    9/2014  Zhang ................ H04N 13/0048
                                                         348/43

FOREIGN PATENT DOCUMENTS

CN    101222638    7/2008
CN    101222639    7/2008
(Continued)

OTHER PUBLICATIONS

International Search Report dated Sep. 23, 2014, issued in application No. PCT/CN2014/079683.
(Continued)

*Primary Examiner* — Zhihan Zhou
(74) *Attorney, Agent, or Firm* — Oblon, McClelland, Maier & Neustadt, L.L.P.

(57) ABSTRACT

A method and apparatus for 3D coding to support fast bi-prediction having identical motion in the advanced residual prediction (ARP) are disclosed. Embodiment of the present invention use one or more aligned operations including data clipping and reference picture selection associated with motion vector derivation during residual predictor generation. When ARP mode is enabled, the residual pre-
(Continued)

diction process for uni-prediction and bi-prediction perform same data clipping process and same reference picture selection process effectively. A single clipping operation or two clipping operations can be performed for both uni-prediction and bi-prediction.

20 Claims, 8 Drawing Sheets

(51) Int. Cl.
      *H04N 19/51*       (2014.01)
      *H04N 19/00*       (2014.01)
      *H04N 19/573*     (2014.01)
      *H04N 19/433*     (2014.01)

(52) U.S. Cl.
      CPC ......... *H04N 19/573* (2014.11); *H04N 19/433* (2014.11)

(58) Field of Classification Search
      USPC ........................................ 348/43; 375/240.16
      See application file for complete search history.

(56) References Cited

FOREIGN PATENT DOCUMENTS

| | | |
|---|---|---|
| JP | 2007329693 | 12/2007 |
| KR | 1020060083053 | 7/2006 |
| WO | WO 2006/075844 | 7/2006 |
| WO | WO 2007/081117 | 7/2007 |

OTHER PUBLICATIONS

Zhang, L., et al.; "Disparity Vector based Advanced Inter-view Prediction in 3D-HEVC;" Circuits and Systems (ISCAS); IEEE; 2013; pp. 1633-1634.

Chen, Y.W., et al.; "3D-CE3 related on complexity reduction of bi-prediction for advanced residual prediction;" Joint Collaborative Team on 3D Video Coding Extensions of ITU-T SG 15 WP 3 and ISO/IEC JTC 1/SC 29/WG 11; Jul. 2013; pp. 1-6.

Zhang, L., et al.; "CE4 Advanced residual prediction for multiview coding;" Joint Collaborative Team on 3D Video Coding Extensions of ITU-T SG 15 WP 3 and ISO/IEC JTC 1/SC 29/WG 11; Apr. 2013; pp. 1-10.

"HTM6.0 source code TComPrediction.cpp;" pp. 1-64.

Chen, Y.W., et al.; "3D-CE5.h related on complexity reduction of bi-prediction for illumination compensation;" Joint Collaborative Team on 3D Video Coding Extensions of ITU-T SG 15 WP 3 and ISO/IEC JTC 1/SC 29/WG 11; Apr. 2013; pp. 1-4.

Lee, J.Y., et al.; "3D-CE4.h related results on simplification of residual prediction;" Joint Collaborative Team on 3D Video Coding Extensions of ITU-T SG 15 WP 3 and ISO/IEC JTC 1/SC 29/WG 11; Jan. 2013; pp. 1-4.

Tech, G., et al.; "3D-HEVC Test Model 3;" Joint Collaborative Team on 3D Video Coding Extensions of ITU-T SG 15 WP 3 and ISO/IEC JTC 1/SC 29/WG 11; Jan. 2013; pp. 1-92.

Liu, H., et al.; "Restricted Inter-view Residual Prediction;" International Organisation for Standardisation; May 2012; pp. 1-6.

Kim, H.Y., et al.; "MC Complexity Reduction for Bi-prediction;" Joint Collaborative Team on Video Coding (JCT-VC) of ITU-T SG16 WP3 and ISO/IEC JTC1/SC29/WG11; Nov. 2011; pp. 1-6.

\* cited by examiner

METHOD OF INTER-VIEW RESIDUAL PREDICTION WITH REDUCED COMPLEXITY IN THREE-DIMENSIONAL VIDEO CODING

CROSS REFERENCE TO RELATED APPLICATIONS

The present invention is a National Phase Application of pending PCT Application Ser. No. PCT/CN2014/079683, filed on Jun. 11, 2014, which claims priority to U.S. Provisional Patent Application Ser. No. 61/833,747, filed on Jun. 11, 2013, entitled "A Scheme for Inter-view Residual Prediction Supporting Identical Motion Checking for 3D Video Coding" and U.S. Provisional Patent Application Ser. No. 61/921,147, filed on Dec. 27, 2013, entitled "A Scheme for Inter-view Residual Prediction for 3D Video Coding". The priority applications are hereby incorporated by reference in their entireties.

FIELD OF THE INVENTION

The present invention relates to three-dimensional and multi-dimensional video coding. In particular, the present invention relates to video coding using advanced residual prediction.

BACKGROUND AND RELATED ART

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). In 3D coding, since all cameras capture the same scene from different viewpoints, a multi-view video contains a large amount of inter-view redundancy. To share the previously encoded residual information of adjacent views, the residual signal for current block (PU) can be predicted by the residual signal of the corresponding blocks, which are located by a DV, in the inter-view pictures.

FIG. 1 illustrates an example of advanced residual prediction (ARP) according to the current design of 3D-HEVC (HTM-9.0), where the residual signal in a current view using temporal prediction is predicted by a residual prediction signal in a reference view. The main procedures of ARP can be described as follows for the case that the current prediction unit (PU) uses temporal prediction (i.e., the reference picture is a temporal reference picture):

1. The temporal reference block (CurrRef 142) in a reference picture (140) of the current view (Vc) is located from the location of the current block (Curr 112) using motion vector (denoted as mvLX, X=0 or 1) and the reference index of the current block in the current picture (110) of the current view (Vc).
2. The corresponding block (Base 122) in the reference picture (120) of the reference view corresponding to the current block (Curr 112) is located from the location of the current block (Curr 112) using a derived disparity vector (DV) of the current block (Curr 112).
3. The temporal reference block (BaseRef 152) for the corresponding block (Base 122) in the reference view (Vr) is located by re-using the temporal motion information (i.e., mvLX and the reference index) of the current block (Curr 112).
4. To reduce the bandwidth of memory access, the motion vector mvLX from the current block is scaled towards a fixed reference picture before performing motion compensation according to the current 3D-HEVC (HTM-9.0) standard when the weighting factor is not 0. Specifically, the fixed reference picture is defined as the first temporal reference picture of each reference picture list.
5. The residual predictor of the temporal residual signal of current PU/block can be calculated as the difference between these two blocks in the reference view (i.e., Base−BaseRef). In other words, the current residual (Curr−CurrRef) is predicted by residual predictor (Base−BaseRef).

FIG. 2 illustrates an example of the ARP derivation for a PU/block coded using temporal prediction.

1. The current temporal prediction residual (Curr residual 210) is formed between the current block (Curr 112) and the corresponding temporal reference block (CurrRef 142).
2. The residual prediction signal (Residual pred 220) is formed between the corresponding signals in reference view (Base 122) and the corresponding temporal reference block (BaseRef 152).
3. The final residual is derived from the difference between the current residual and the residual prediction signal.

When the current PU uses inter-view prediction (i.e., the reference picture is an inter-view reference picture) instead of temporal prediction, the main procedures of ARP can be described as shown in FIG. 3.

1. The inter-view reference block (Base 322) of the reference view picture (320) in the reference view (Vr) is located by the disparity motion vector (330) of the current block (Curr 312) of the current picture (310) in the current view (Vc).
2. The temporal reference block (BaseRef 352) of the inter-view reference block (Base 322) in the reference view is located using the temporal motion vector (mvLX) and reference index, where L0 motion information is firstly used; if L0 motion information is not available, L1 motion information is then used.
3. A corresponding reference block (CurrRef 342) in the current view is located from the location of the temporal reference block (BaseRef 352) of the inter-view reference block (Base 322) in the reference view by re-using the disparity motion vector (330) of the current block (312).
4. To reduce the bandwidth of memory access, in current 3D-HEVC (HTM-9.0), the motion vectors mvL0 (or mvL1) from the inter-view reference block (Base 322) is scaled towards a fixed reference picture before performing motion compensation when the weighting factor is not 0. The fixed picture is defined as the first temporal reference picture of each reference picture list. However, when mvL0 from Base is invalid, the motion vector mvL1 from Base will be used. If both mvL0 and mvL1 from Base are invalid, a zero vector will be used and the reference picture will be set as the first temporal reference picture of that prediction direction of current block (list 0 or list 1). A motion vector from the inter-view reference block (Base 322) may be invalid if the inter-view reference block (Base 322) has no L0 MV, or the list 0 prediction for the inter-view reference block (Base 322) is inter-view disparity compensated prediction.

5. The residual predictor of the inter-view residual signal of current PU/block can be calculated as the difference between these two blocks in a reference time, i.e., another access unit (CurrRef−BaseRef).

FIG. 4 illustrates an example of the ARP derivation for a PU/block using inter-view prediction.

1. The current inter-view prediction residual (Curr residual 410) is formed between the current block (Curr 312) and the inter-view reference block (Base 322).
2. The residual prediction signal (Residual pred 420) is formed between the corresponding reference block (CurrRef 342) in current view and the temporal reference block (BaseRef 352) of the inter-view reference block (Base 322) in the reference view.
3. The final residual is derived from the difference between the current residual and the residual prediction signal.

FIG. 5 illustrates a pictorial example of the ARP derivation for a PU/block using temporal prediction. Block 510 represents the current block in the current view (i.e., view 1), block 520 and block 530 denote the representation of current block 510 in the reference view (view 0) at time Tj and temporal prediction of current block 510 from the same view (view 1) at time Ti respectively. Motion vector 550 denotes the motion from current block 510 to block 530 at time Ti from the same view. Since current block 510 in view 1 and corresponding block 520 in view 0 represent projections of the same object in two different views, these two blocks should share the same motion information. Therefore, temporal prediction block 540 in view 0 at time Ti of corresponding block 520 in view 0 at time Tj can be located from corresponding block 520 in view 0 by applying the motion information of motion vector 550 (i.e., MV 560=MV 550). The residue (i.e., 540) of corresponding block 520 is then multiplied by a weighting factor and is used along with the corresponding block (i.e., 520) to form the predictor for current block (i.e., 510).

FIG. 6 illustrates an example of ARP bi-prediction mode having two different motion vectors (L0 MV 640 and L1 MV 650) for the current block (612) of the current picture (610) in a current view (V1). Motion information of the current PU (612) in the current picture of the current view is applied to the corresponding block (662) in the reference picture (660) of the reference view (V0). The predicting residual signal is then generated by performing motion compensation based on the L0 and L1 motion information of the current PU. The first residual is generated between the corresponding block (662) and the L0 reference block (672) of reference picture (670) in the reference view (V0) using L0 MV. The second residual is generated between the corresponding block (662) and the L1 reference block (682) of reference picture (680) in the reference view (V0) using L1 MV. Only one clipping operation is employed during the generation of L0 and L1 predicting signal. The L0 and L1 motion compensated prediction signal is respectively generated by an interpolation process without any clipping operation. The interpolated signal is then added by the predicting residual signal generated by ARP. In the final stage, the L0 and L1 prediction signal are added up followed by a clipping operation and are output as the final result. In the ARP scheme according to the current 3D-HEVC (i.e., HTM-9.0), two clipping operations are applied during the generation of L0 or List predicting signal when current PU is a uni-prediction PU. The L0 or L1 motion compensated prediction signal is firstly generated by an interpolation process followed by a clipping operation (clipping to a valid range of input bit depth). The clipped signal is then added by the predicting residual signal generated by ARP and followed by the second clipping operation to be output as the final result.

Moreover, in ARP, the first temporal reference picture of each reference list in the reference view (i.e., V0) is selected as the reference picture of the corresponding block as shown in FIG. 6. The motion vectors of the current PU are then scaled towards the selected reference picture of the corresponding block in the reference view to generate the predicting residual signal by performing motion compensation. FIG. 7 illustrates the case when the current PU is bi-prediction with identical motion vector (740) for L0 and L1. Different predicting residual signals may be generated for L0 and L1 due to different reference pictures for L0 and L1. In this example, the L1 MV is scaled to point to the reference block (782) in the reference picture (780) in the opposite direction. It may result in degradation of the prediction performance by scaling a MV to the reference picture in the opposite direction when a reference picture in the same direction is available.

According to the current 3D-HEVC (i.e., HTM-9.0), if the two motion vectors for a bi-prediction mode are the same, the bi-prediction mode cannot be simplified as a uni-prediction mode since the uni-prediction mode would not generate the same result as the bi-prediction mode. It is desirable to develop a new ARP procedure that can take advantage of uni-prediction as a simplified bi-prediction if the two motion vectors are the same.

BRIEF SUMMARY OF THE INVENTION

A method and apparatus for three-dimensional or multi-view video coding to support fast bi-prediction mode having identical motion in residual prediction mode such as the advanced residual prediction (ARP) mode are disclosed. Embodiment of the present invention use one or more aligned operations including data clipping and reference picture selection associated with motion vector derivation during residual predictor generation. When a residual prediction mode is enabled and the current block is coded using uni-prediction, the system generates a residual signal for the current block based on only list 0 reference data or list 1 reference data and generates a residual predictor using only the list 0 reference data or the list 1 reference data according to a first residual generation process. When the residual prediction mode is enabled and the current block is coded using bi-prediction, the system generates the residual signal for the current block based on both the list 0 reference data and list 1 reference data. The system then generates the residual predictor from a list 0 residual predictor and a list 1 residual predictor, where the list 0 residual predictor is generated using the list 0 reference data of the current block according to a second residual generation process, and the list 1 residual predictor is generated using the list 1 reference data of the current block according to a third residual generation process. After the residual predictor is generated for both uni-prediction and bi-prediction cases, the system then encode or decode the current block by applying the residual prediction to the residual signal of the current block using the residual predictor. In order to support the fast bi-prediction mode having identical motion in the residual prediction mode, the first residual generation process, the second residual generation process and the third residual generation process all include at least one of same data clipping process and same reference picture selection process. For example, all residual generation processes may use one data clipping or two data clippings. In another embodiment, the second residual generation process and the third residual generation process may select same reference pictures to generate the residual signal when list 0 motion information and list 1 motion information of the current block are identical.

When the residual signal for the current block corresponds to a temporal residual signal between the current block and a current temporal reference block of the current block, the current temporal reference block is located based on a current block location using a first scaled MV derived from the MV (motion vector) of the current block. In this case, the residual predictor is generated based on a corresponding block in the reference view and the temporal reference block of the corresponding block in the reference view. The corresponding block in the reference view is located based on the current block location and a derived disparity vector (DV), and the temporal reference block of the corresponding block is located based on a corresponding block location using a first scaled MV derived from the MV of the current block. When the residual signal for the current block corresponds to an inter-view residual signal between the current block and a current inter-view reference block of the current block, the current inter-view reference block is located based on the current block location and a DV (disparity vector) of the current block. In this case, the residual predictor is generated based on the temporal reference block of the current inter-view reference block in the reference view and a corresponding reference block of the temporal reference block of the current inter-view reference block. The temporal reference block of the current inter-view reference block is located based on a current inter-view reference block location using a second scaled MV (motion vector) derived from the MV of the current inter-view reference block, and the corresponding reference block of the temporal reference block of the current inter-view reference block is located based on a first location using a second scaled MV (motion vector) derived from the MV of the current inter-view reference block.

One aspect of the present invention addresses various means to select a target reference picture.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In current reference software for 3D-HEVC (i.e., HTM-9.0), when two sets of motion information used for bi-prediction refer to the same reference block, it offers the option to change inter prediction direction from bi-prediction to uni-prediction. By doing so, it could reduce the computational complexity of redundant motion compensation. It will also reduce system memory bandwidth requirement since the same reference data will be accessed only once in the uni-prediction mode. This property is referred to as identical motion checking or fast bi-prediction. Nevertheless, in the current 3D-HEVC, the advanced residual prediction (ARP) cannot take advantage of this reduced complexity due to the unequal clipping operations between uni-prediction and bi-prediction.

Figure 1:
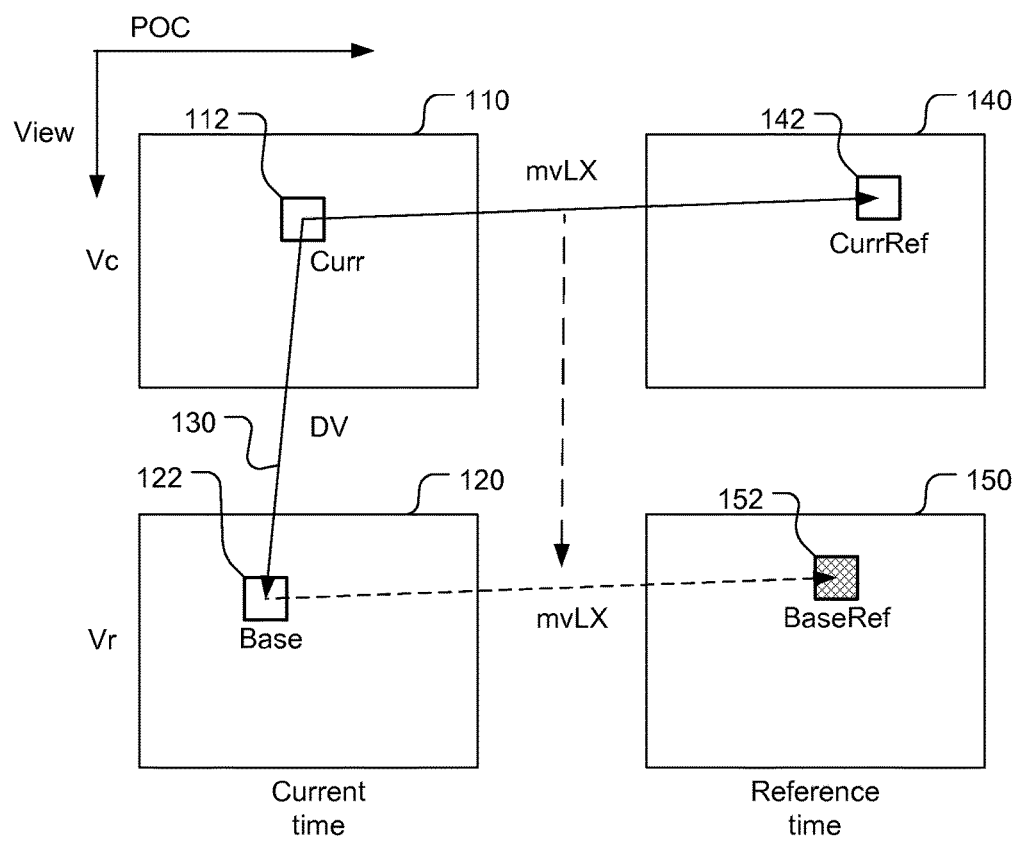
FIG. 1 illustrates an example of advanced residual prediction (ARP) for a block coded using temporal prediction, where the temporal residual signal is predicted by a corresponding residual signal in a reference view.
Figure 2:
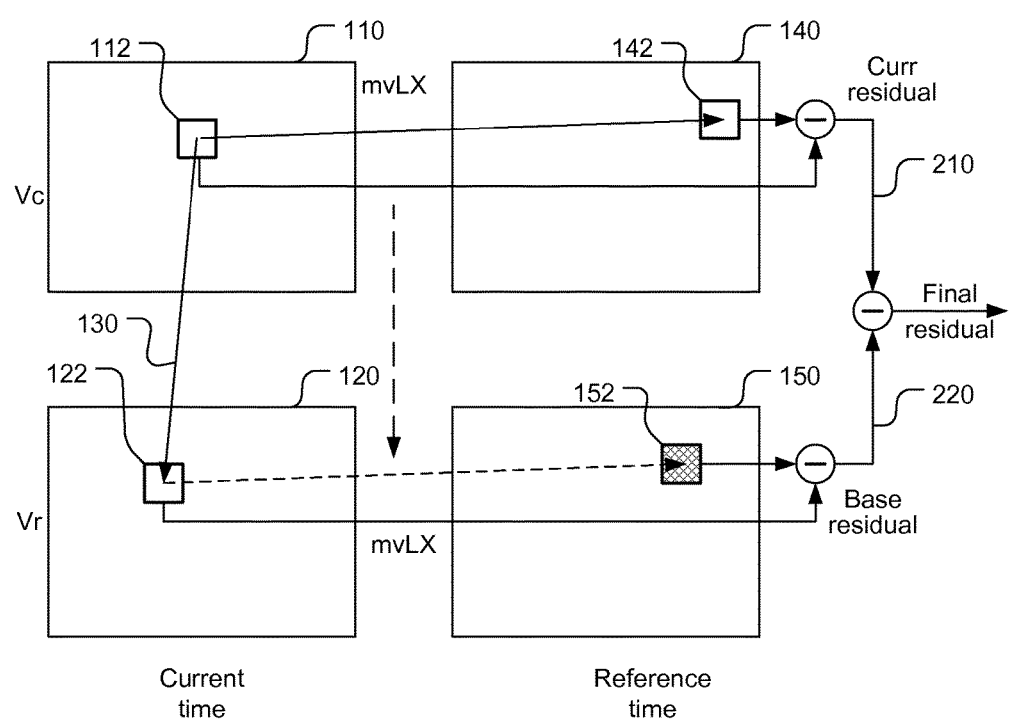
FIG. 2 illustrates the prediction process of advanced residual prediction for the temporal residual signal.
Figure 3:
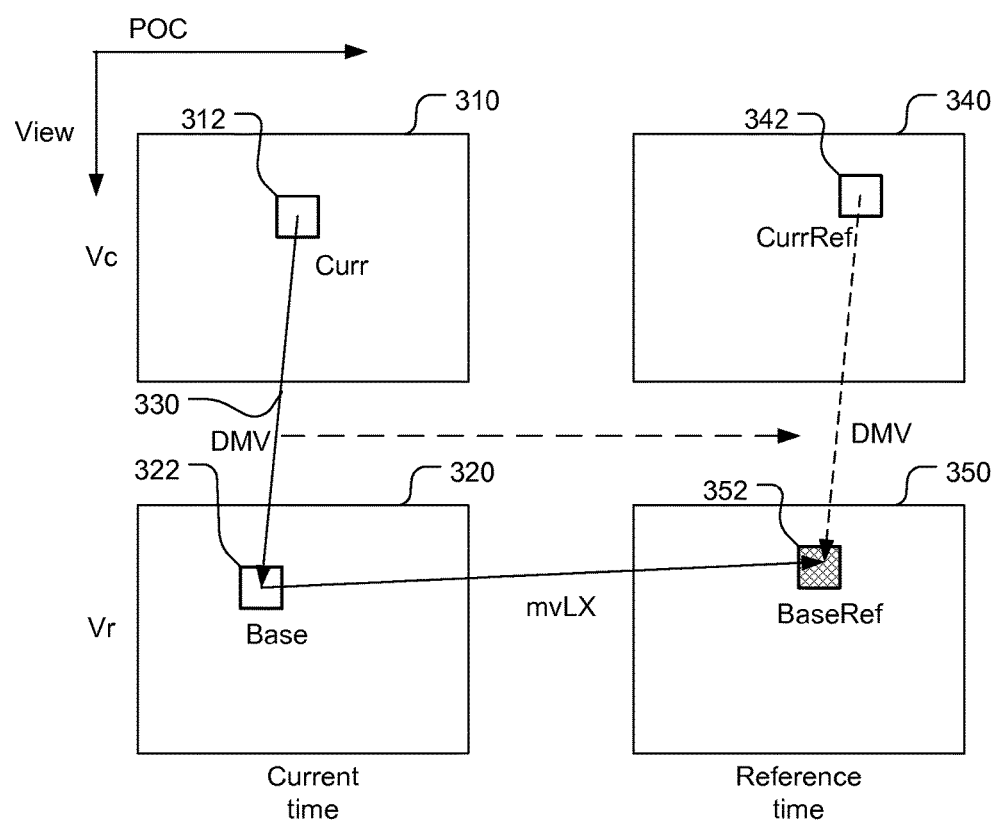
FIG. 3 illustrates an example of advanced residual prediction for a block coded using inter-view prediction, where the inter-view residual signal is predicted by a corresponding residual signal in another access unit (or another reference time).
Figure 4:
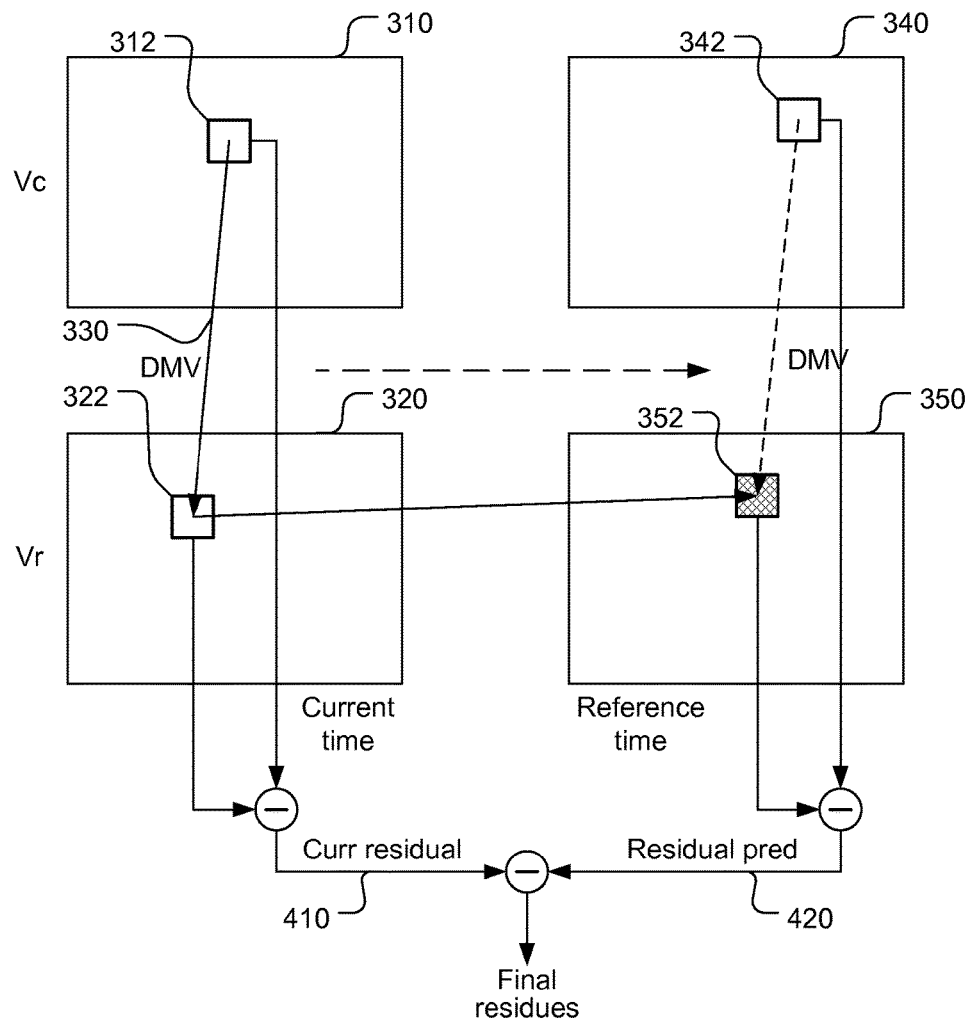
FIG. 4 illustrates the prediction process of advanced residual prediction for the inter-view residual signal.
Figure 5:
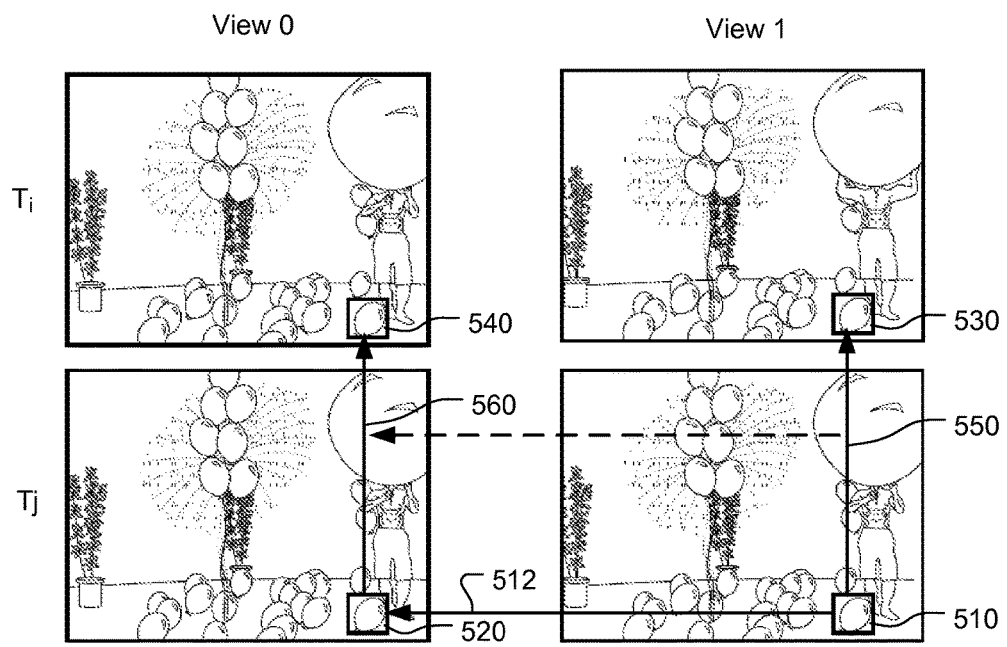
FIG. 5 illustrates a pictorial example of prediction process of advanced residual prediction for the temporal residual signal.
Figure 6:
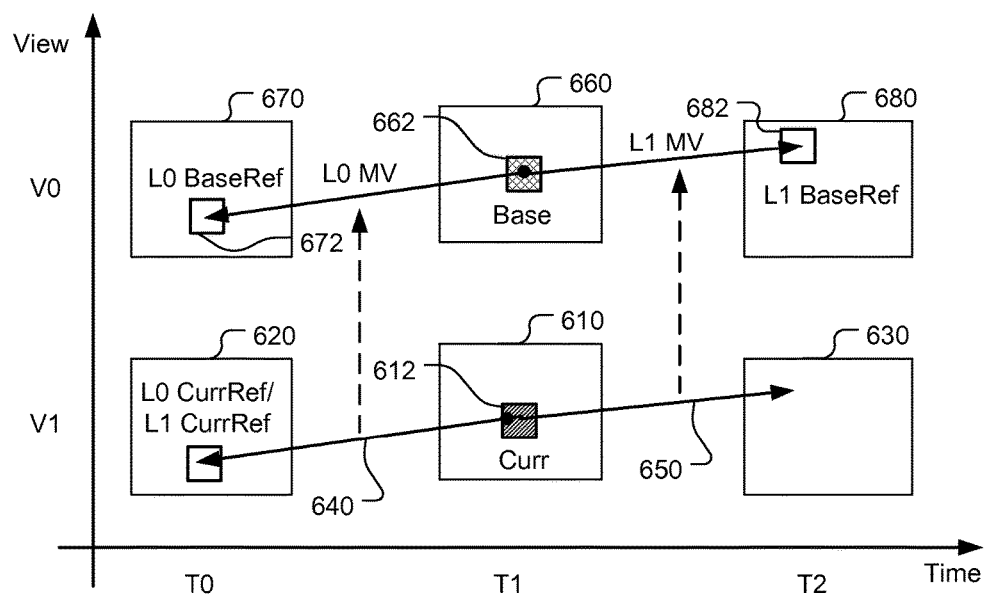
FIG. 6 illustrates an example of motion information reuse in bi-prediction, where the list 0 and list 1 motion vectors point to different reference pictures.
Figure 7:
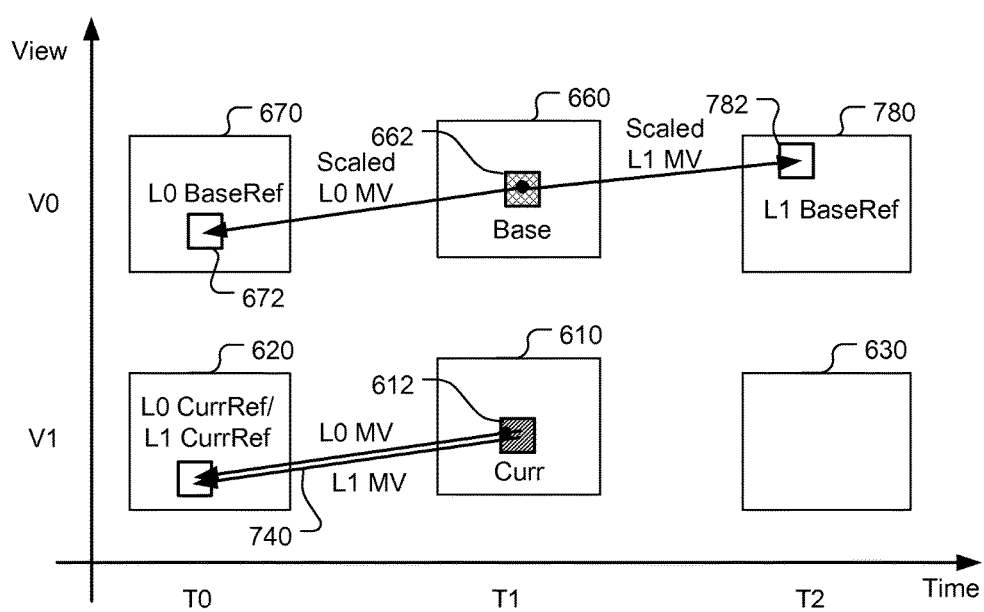
FIG. 7 illustrates an example of motion information reuse in bi-prediction mode, where the list 0 and list 1 motion vectors are identical and, however, two different target reference pictures are selected according to a conventional approach.

Besides, when performing ARP as described above, the motion vectors of the current PU is scaled towards the first reference picture of each reference picture list. By doing so, the identical motion checking may also result in different prediction results due to different prediction signal generated for different lists as described in FIG. 7.

In the present invention, various embodiments are disclosed to support the property of identical motion checking In one embodiment, the identical motion checking process is disabled for CUs (coding units) or PUs with ARP enabled. However, the identical motion checking can still be performed for those non-ARP enabled CUs/PUs to save memory access bandwidth.

In another embodiment, the identical motion checking to support CUs or PUs with ARP enabled is achieved by aligning the operations between uni-prediction and bi-prediction when ARP is enabled. The residual predictor derived from bi-prediction mode and the uni-prediction mode will be the same. Therefore, the property of identical motion checking can be supported for the CUs/PUs with ARP enabled.

In order to align the process for the bi-prediction mode and the uni-prediction mode, the clipping process for the two prediction modes is unified. Examples of various embodiments incorporating unified clipping process are disclosed as follows.

First embodiment: two-clipping approach. Both uni-prediction and bi-prediction are applied two clipping operations equally. The interpolated pixels and residual signals output by the interpolation filter are applied with the first clipping operation. Then the clipped pixels and residual signals are added together and are then applied with another clipping to form the residual predictors. For the bi-prediction, the predictors for L0 and L1 are averaged. The third clipping operation can be applied to ensure the averaged predictors are within the valid range. However, in this embodiment, the third clipping operation can be skipped for bi-prediction without affecting the results.

Second embodiment: one-clipping approach. Both uni-prediction and bi-prediction are applied with one clipping operation equally. The interpolated pixels and residual signals output by the interpolation filter are added directly, where the operation may be performed with higher precision by using higher bit depth. For the uni-prediction, the final predictors which add the motion compensated signals and residual signals together are applied with the clipping operation. For the bi-prediction, the final predictors for each list (L0 and L1) are averaged and then applied with the clipping operation.

As mentioned before, beside different clipping process between bi-prediction and uni-prediction, the reference picture selected for bi-prediction and uni-prediction may also be different in the case that both motion vectors of the current block are the same. The issue of different reference picture derivation between the bi-prediction and the uni-prediction are resolved in the following embodiments.

Third embodiment: single reference picture in base view for both L0 and L1 in the temporal prediction ARP mode. When the temporal prediction is used by the current PU, both L0 and L1 MVs of the current block are scaled to the same target reference picture. Some examples of single reference picture according to this embodiment are shown below:
1. The first reference picture in L0 reference picture list of current picture in current view,
2. The first reference picture in L1 reference picture list of current picture in current view,
3. The first reference picture in L0 reference picture list of current picture in reference view,
4. The first reference picture in L1 reference picture list of current picture in reference view,
5. Any other reference picture in the reference picture list of the current view or reference view.

Fourth embodiment: reference picture in the base view selected based on the smallest POC (picture order count) distance for the temporal prediction ARP mode. When the temporal prediction is used by the current PU, to derive L0 predicting residual signal, L0 MV of the current block is scaled to the target reference picture which is in the set of temporal reference pictures for residual prediction and has the smallest POC distance compared to the L0 reference picture of the current block. When more than one reference picture has the smallest POC distance, the one in L0 (or the one in the same list as the current block) is used first. The residual predictor is then calculated as the difference between the block Base and the block BaseRef in the target reference picture.

To derive L1 predicting residual signal, L1 MV of the current block is scaled to the reference picture which is in the set of temporal reference pictures for residual prediction and has the smallest POC distance compared to the L1 reference picture of the current block. When more than one reference pictures have the smallest POC distance, the one in list 0 (or the one in the same list as the current block) is used first. The residual predictor is then calculated as the difference between the block Base and the block BaseRef in the target reference picture.

The set of temporal reference pictures for residual prediction contains the reference pictures which are allowed to generate the predicting residual signal. In one example, only the first temporal reference picture in L0 and L1 are included in the set.

Figure 8:
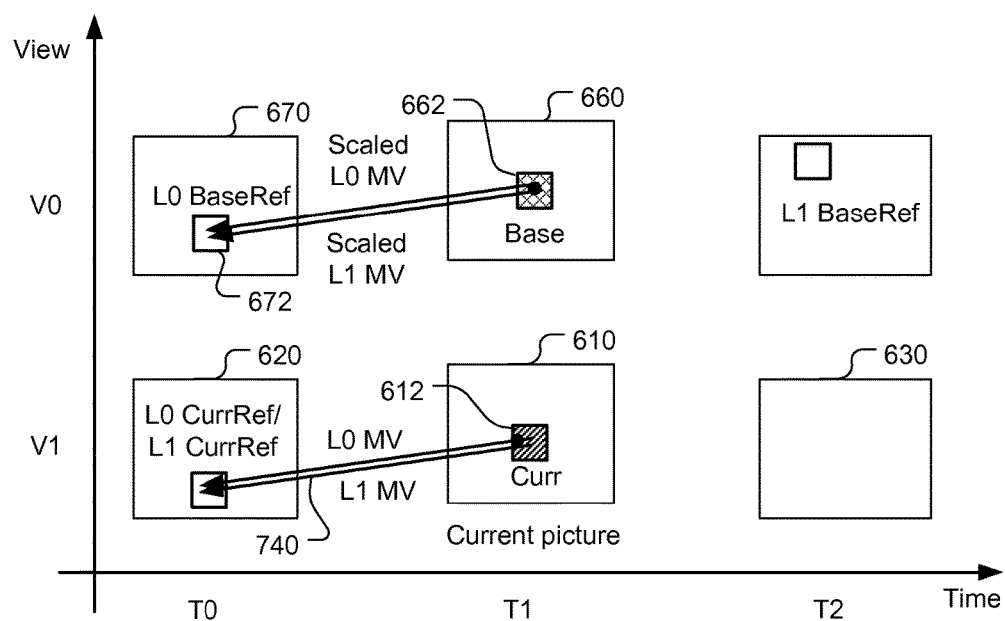
FIG. 8 illustrates an example of motion information reuse in bi-prediction mode, where the list 0 and list 1 motion vectors are identical and, two identical target reference pictures are selected according to an embodiment of the present invention.

FIG. 8 shows an example of the fourth embodiment, where L0 and L1 motion vectors (740) of current PU (612) are identical, and the first temporal reference in L0 and the first temporal reference picture in L1 are both in the set of temporal reference pictures for residual prediction. Since the reference picture in L0 has the smallest POC distance compared to the L0 and L1 reference picture of the current PU, respectively, both L0 and L1 predicting residual signals are generated by scaling both the L0 and L1 MVs to the first temporal reference picture (670) in L0. Accordingly, the reference pictures generated by the bi-prediction and the reference picture from the uni-prediction will be the same.

Fifth embodiment: single reference picture in base view for both L0 and L1 in the inter-view prediction ARP mode. When the inter-view prediction is used by the current PU, both L0 and L1 MVs of the current block are scaled to the same target reference picture. Some examples of single reference picture according to this embodiment are shown below:
1. The first reference picture in L0 reference picture list of current picture in current view,
2. The first reference picture in L1 reference picture list of current picture in current view,
3. The first reference picture in L0 reference picture list of current picture in reference view,
4. The first reference picture in L1 reference picture list of current picture in reference view,
5. Any other reference picture in the reference picture list of the current view or reference view.

Sixth embodiment: reference picture in base view selection based on the first temporal reference picture in L0 and L1 for the inter-view prediction ARP mode. When the inter-view prediction is used by the current PU, to derive L0 predicting residual signal, the L0 MV of block Base is scaled to the first temporal reference picture in L0 of the current block. If L0 motion information is not available, L1 motion is used (the L1 MV of block Base is scaled to the first temporal reference picture in L1 of the current block). If both mvL0 and mvL1 from Base are invalid, a zero vector will be used and the reference picture will be set as the first temporal reference picture in L0.

To derive L1 predicting residual signal, the L0 MV of block Base is scaled to the first temporal reference picture in L0 of the current block. If L0 motion information is not available, L1 motion is used (the L1 MV of block Base is scaled to the first temporal reference picture in L1 of the current block). If both mvL0 and mvL1 from Base are invalid, a zero vector will be used and the reference picture will be set as the first temporal reference picture in L0.

Seventh embodiment: similar to the sixth embodiment except for different handling for the case that both mvL0 and mvL1 from Base are invalid. When the inter-view prediction is used by the current PU, the L0 predicting residual signal is derived as follows. The L0 MV of block Base is scaled to the first temporal reference picture in L0 of the current block. If L0 motion information is not available, L1 motion is used. If both mvL0 and mvL1 from Base are invalid, a zero vector will be used and the reference picture will be set to the reference picture that has the smallest POC distance compared to the L0 reference picture of the current block from a set of temporal reference pictures. When more than one reference pictures have the smallest POC distance, the reference picture in L0 (or the one in the same list of the current block) is used first.

To derive L1 predicting residual signal, the L0MV of block Base is scaled to the first temporal reference picture in L0 of the current block (if L0 motion information is not available, L1 motion is used). If both mvL0 and mvL1 from Base are invalid, a zero vector will be used and the reference picture will be set to the reference picture having the smallest POC distance compared to the L1 reference picture of the current block from a set of temporal reference pictures for residual prediction. When more than one reference pictures have the smallest POC distance, the one in list X (X can be 0 or 1), or the one in the same list, is used first. A flag can also be transmitted in the sequence, view, picture, slice, CTU, CU, PU level to indicate X.

Eighth embodiment: also similar to the sixth embodiment except for the reference picture selection associated with the scaling of L0 MV and L1 MV of block Base. When the current PU uses inter-view prediction, the L0 predicting residual signal is generated as follows. The L0 MV of block Base is scaled to the reference picture which is in the set of temporal reference pictures for residual prediction and has the smallest POC distance compared to the L0 reference picture of the current block. If L0 motion information is not available, L1 motion information is used. In this case, the L1 MV of block Base is scaled to the reference picture which is in the set of temporal reference pictures for residual prediction and has the smallest POC distance compared to the L1 reference picture of the current block. If both mvL0 and mvL1 from Base are invalid, a zero vector will be set to the reference picture having the smallest POC distance compared to the L0 reference picture of the current block from a set of temporal reference pictures for residual prediction. When more than one reference pictures have the smallest POC distance, the reference picture in list X (X can be 0 or 1), or the reference picture in the same list, is used first. A flag can also be transmitted in the sequence, view, picture, slice, CTU (Coding Tree Unit), CU (Coding Unit), PU level to indicate X.

To derive L1 predicting residual signal, the L0 MV of block Base is scaled to the reference picture which is in the set of temporal reference pictures for residual prediction and has the smallest POC distance compared to the L0 reference picture of the current block. If L0 motion information is not available, L1 motion information is used. In this case, the L1 MV of block Base is scaled to the reference picture which is in the set of temporal reference pictures for residual prediction and has the smallest POC distance compared to the L1 reference picture of the current block). If both mvL0 and mvL1 from Base are invalid, a zero vector will be used and the reference picture will be set to the one having the smallest POC distance compared to the L1 reference picture of the current block from a set of temporal reference pictures for residual prediction. When more than one reference pictures have the smallest POC distance, the one in list X (X can be 0 or 1), or the one in the same list of the current block is used first. A flag can also be transmitted in the sequence, view, picture, slice, CTU, CU, PU level to indicate X.

Ninth embodiment: similar to the eighth embodiment except for the determination of the smallest POC distance when L0 MV or L1 MV is not available. When the inter-view prediction is used by the current PU, the L0 predicting residual signal is generated as follows. L0 MV of block Base is scaled to the reference picture which is in the set of temporal reference pictures for residual prediction and has the smallest POC distance compared to the current picture. If L0 motion information is not available, L1 motion information is used. In this case, the L1 MV of block Base is scaled to the reference picture which is in the set of temporal reference pictures for residual prediction and has the smallest POC distance compared to the current picture. If both mvL0 and mvL1 from Base are invalid, a zero vector will be used and the reference picture will be selected as the one which is in the set of temporal reference pictures for residual prediction and has the smallest POC distance compared to the current picture. When more than one reference pictures have the smallest POC distance, the one in list X (X can be 0 or 1), or the one in the same list is used first. A flag could also be transmitted in the sequence, view, picture, slice, CTU, CU, PU level to indicate X.

The L1 predicting residual signal can be derived as follows. L1 MV of block Base is scaled to the reference picture which is in the set of temporal reference pictures for residual prediction and has the smallest POC distance compared to the current picture. If L1 motion information is not available, L0 motion is used. In this case, the L0 MV of block Base is scaled to the reference picture which is in the set of temporal reference pictures for residual prediction and has the smallest POC distance compared to the current picture. If both mvL0 and mvL1 from Base are invalid, a zero vector will be used and the reference picture will be selected as the one which is in the set of temporal reference pictures for residual prediction and has the smallest POC distance compared to the current picture. When more than one reference pictures have the smallest POC distance, the one in list X (X could be 0 or 1), or the one in the same list is used first. A flag could also be transmitted in the sequence, view, picture, slice, CTU, CU, PU level to indicate X.

For above methods, the set of temporal reference pictures for residual prediction contains the reference pictures which are allowed to generate the predicting residual signal. In one example, only the first temporal reference picture in L0 and L1 are included in the set. In another example, only one temporal reference picture in L0 with smallest QP (Quantization Parameter) and one temporal reference picture in L1 with smallest QP are included in the set. For the above methods, when the first temporal reference picture in List X (X could be 0 or 1) is not available, the first temporal reference in the other list (1−X) could be used instead.

The performance of a 3D or multi-view video coding system incorporating an embodiment of the present invention is compared to the performance of a conventional system based on HTM-10.0 as shown in Tables 1-3. Table 1 corresponds to the result for a system only using unified clipping for uni-prediction and bi-prediction in ARP. Table 2 corresponds to the result for a system only using the reference picture selection process. Systems corresponding to Table 1 and Table 2 only incorporate partial feature of the present invention. Table 3 corresponds to the result for a system using both the unified clipping and the aligned reference picture selection process according to one embodiment of the present invention. System for Table 4 is the same as the system for Table 3 except that the system is compared to an anchor system using both the unified clipping and the aligned reference picture selection process, but with the fast bi-prediction disabled at the decoder. A negative value in the BD-rate implies the new system has better perform than the anchor system. The BD-rate differences for texture pictures in view 1 (video 1), view 2 (video 2), texture video only (video/video bitrate), the total bitrate (texture bitrate and depth bitrate) for texture video (video/total bitrate) and the total bitrate for coded and synthesized video (Synth/total bitrate) are small in all cases. The BD-rate differences in Table 3 show no degradation due to the unified clipping and aligned reference picture selection according to an embodiment of the present invention. The run times in terms of encoding time, decoding time and rendering time are about the same. Therefore, the embodiment (Table 3) according to the present invention can reduce system bandwidth without the penalty of performance loss by allowing the fast bi-prediction.

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.4% | 0.4% | 0.2% | 0.2% | 0.1% | 100.4% | 103.7% | 99.5% |
| Kendo | 0.0% | 0.3% | 0.4% | 0.2% | 0.2% | 0.1% | 102.3% | 110.6% | 102.4% |
| NewspaperCC | 0.0% | 0.3% | 0.2% | 0.1% | 0.1% | 0.1% | 102.4% | 101.3% | 101.1% |
| GhostTownFly | 0.0% | −0.1% | 0.0% | 0.0% | 0.0% | −0.1% | 101.8% | 101.1% | 100.7% |
| PoznanHall2 | 0.0% | 0.2% | −0.1% | 0.1% | 0.1% | −0.1% | 100.1% | 98.7% | 97.9% |
| PoznanStreet | 0.0% | 0.3% | 0.2% | 0.1% | 0.1% | 0.0% | 101.8% | 103.8% | 100.1% |
| UndoDancer | 0.0% | 0.1% | 0.0% | 0.0% | 0.0% | 0.1% | 98.9% | 102.1% | 100.5% |
| Shark | 0.0% | 0.2% | 0.3% | 0.1% | 0.1% | 0.0% | 101.1% | 97.8% | 100.5% |
| 1024 × 768 | 0.0% | 0.4% | 0.3% | 0.2% | 0.2% | 0.1% | 101.7% | 105.2% | 101.0% |
| 1920 × 1088 | 0.0% | 0.1% | 0.1% | 0.1% | 0.0% | 0.0% | 100.8% | 100.7% | 99.9% |
| average | 0.0% | 0.2% | 0.2% | 0.1% | 0.1% | 0.0% | 101.1% | 102.4% | 100.3% |

TABLE 2

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | −0.5% | −0.3% | −0.1% | −0.1% | −0.1% | 98.6% | 109.3% | 97.1% |
| Kendo | 0.0% | −0.6% | −0.5% | −0.2% | −0.2% | −0.2% | 101.8% | 102.2% | 103.0% |
| NewspaperCC | 0.0% | −0.3% | −0.3% | −0.1% | −0.1% | −0.1% | 102.1% | 98.9% | 100.4% |
| GhostTownFly | 0.0% | −0.1% | −0.1% | 0.0% | 0.0% | 0.0% | 101.1% | 101.3% | 100.4% |
| PoznanHall2 | 0.0% | 0.0% | −0.3% | −0.1% | −0.1% | −0.1% | 100.5% | 95.5% | 101.4% |
| PoznanStreet | 0.0% | −0.1% | −0.1% | 0.0% | 0.0% | 0.0% | 101.7% | 108.4% | 101.3% |
| UndoDancer | 0.0% | −0.2% | −0.2% | 0.0% | 0.0% | −0.1% | 100.5% | 100.5% | 99.4% |
| Shark | 0.0% | −0.2% | −0.3% | 0.0% | 0.0% | −0.1% | 99.9% | 98.8% | 100.3% |
| 1024 × 768 | 0.0% | −0.5% | −0.4% | −0.1% | −0.1% | −0.1% | 100.8% | 103.4% | 100.2% |
| 1920 × 1088 | 0.0% | −0.1% | −0.2% | 0.0% | 0.0% | −0.1% | 100.7% | 100.9% | 100.6% |
| average | 0.0% | −0.3% | −0.3% | −0.1% | −0.1% | −0.1% | 100.8% | 101.8% | 100.4% |

TABLE 3

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.0% | 0.1% | 0.0% | 0.1% | 0.0% | 99.4% | 99.9% | 96.7% |
| Kendo | 0.0% | −0.2% | −0.2% | 0.0% | 0.0% | 0.0% | 101.0% | 99.0% | 101.1% |
| NewspaperCC | 0.0% | 0.0% | 0.0% | 0.0% | 0.0% | 0.0% | 101.0% | 103.7% | 100.1% |

TABLE 3-continued

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| GhostTownFly | 0.0% | −0.1% | −0.1% | 0.0% | 0.0% | 0.0% | 100.0% | 100.3% | 99.2% |
| PoznanHall2 | 0.0% | 0.2% | −0.2% | 0.0% | 0.0% | −0.1% | 100.9% | 99.7% | 99.0% |
| PoznanStreet | 0.0% | 0.1% | 0.0% | 0.1% | 0.1% | 0.0% | 100.7% | 100.2% | 100.5% |
| UndoDancer | 0.0% | −0.1% | −0.1% | 0.0% | 0.0% | 0.1% | 100.3% | 99.0% | 100.3% |
| Shark | 0.0% | 0.0% | 0.1% | 0.0% | 0.0% | 0.0% | 100.1% | 98.4% | 100.4% |
| 1024 × 768 | 0.0% | −0.1% | −0.1% | 0.0% | 0.0% | 0.0% | 100.5% | 100.9% | 99.3% |
| 1920 × 1088 | 0.0% | 0.0% | −0.1% | 0.0% | 0.0% | 0.0% | 100.4% | 99.5% | 99.9% |
| average | 0.0% | 0.0% | −0.1% | 0.0% | 0.0% | 0.0% | 100.4% | 100.0% | 99.7% |

TABLE 4

| | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Balloons | 0.0% | 0.0% | 0.0% | 0.0% | 0.0% | 0.0% | 100.1% | 93.3% | 101.2% |
| Kendo | 0.0% | 0.0% | 0.0% | 0.0% | 0.0% | 0.0% | 99.6% | 94.0% | 98.7% |
| NewspaperCC | 0.0% | 0.0% | 0.0% | 0.0% | 0.0% | 0.0% | 99.2% | 96.6% | 99.8% |
| GhostTownFly | 0.0% | 0.0% | 0.0% | 0.0% | 0.0% | 0.0% | 100.9% | 93.5% | 98.0% |
| PoznanHall2 | 0.0% | 0.0% | 0.0% | 0.0% | 0.0% | 0.0% | 99.8% | 97.1% | 99.3% |
| PoznanStreet | 0.0% | 0.0% | 0.0% | 0.0% | 0.0% | 0.0% | 97.0% | 94.7% | 99.8% |
| UndoDancer | 0.0% | 0.0% | 0.0% | 0.0% | 0.0% | 0.0% | 100.5% | 95.6% | 100.2% |
| Shark | 0.0% | 0.0% | 0.0% | 0.0% | 0.0% | 0.0% | 99.3% | 97.3% | 98.7% |
| 1024 × 768 | 0.0% | 0.0% | 0.0% | 0.0% | 0.0% | 0.0% | 99.6% | 94.6% | 99.9% |
| 1920 × 1088 | 0.0% | 0.0% | 0.0% | 0.0% | 0.0% | 0.0% | 99.5% | 95.6% | 99.2% |
| average | 0.0% | 0.0% | 0.0% | 0.0% | 0.0% | 0.0% | 99.5% | 95.3% | 99.5% |

Figure 9:
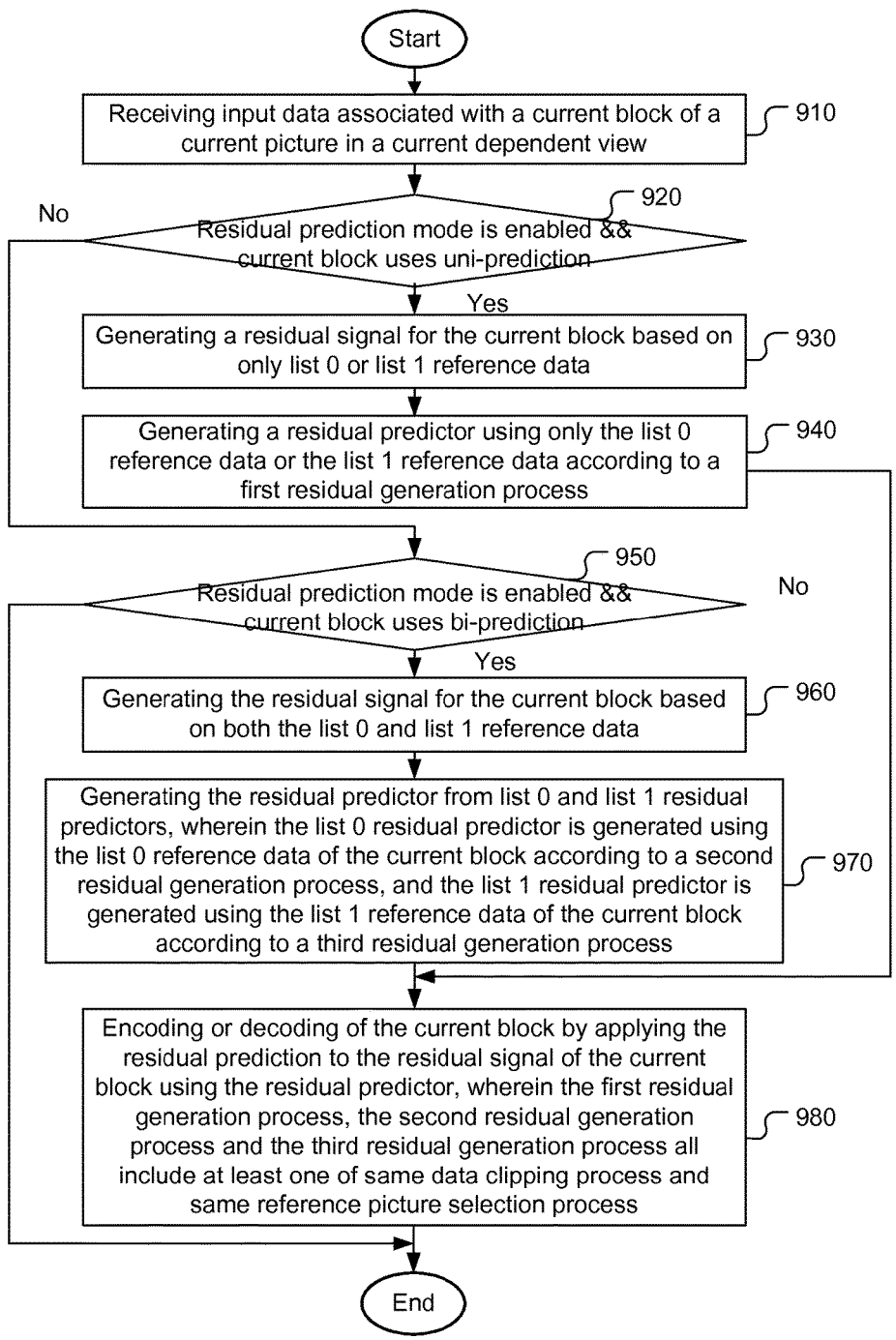
FIG. 9 illustrates an exemplary flowchart of a 3D coding system incorporating aligned uni-prediction and bi-prediction processes to support fast bi-prediction mode having identical motion in the advanced residual prediction (ARP) mode according to one embodiment of the present invention.

FIG. 9 illustrates an exemplary flowchart for a three-dimensional or multi-view video coding system according to an embodiment of the present invention. The system receives input data associated with a current block of a current picture in a current dependent view in step 910. The input data may correspond to texture data or coded texture data of the current block. The input data may be retrieved from storage such as a computer memory, buffer (RAM or DRAM) or other media. The input data may also be received from a processor such as a controller, a central processing unit, a digital signal processor or electronic circuits that derives the input data. A test is performed in step 920 regarding whether the residual prediction mode is enabled and the current block is coded using uni-prediction. If the result is asserted, steps 930, 940 and 980 are performed. Otherwise, further test is performed in step 950. In step 930, a residual signal for the current block is generated based on only list 0 reference data or list 1 reference data. In step 940, a residual predictor is generated using only the list 0 reference data or the list 1 reference data according to a first residual generation process. In step 980, the current block is encoded or decoded by applying the residual prediction to the residual signal of the current block using the residual predictor. In step 950, a test is performed regarding whether the ARP mode is enabled and the current block is coded using bi-prediction. If the result is asserted, steps 960, 970 and 980 are performed. Otherwise, the process is finished. In step 960, the residual signal for the current block is generated based on both the list 0 reference data and list 1 reference data. In step 970, the residual predictor from a list 0 residual predictor and a list 1 residual predictor is generated, where the list 0 residual predictor is generated using the list 0 reference data of the current block according to a second residual generation process, and the list 1 residual predictor is generated using the list 1 reference data of the current block according to a third residual generation process. The first residual generation process, the second residual generation process and the third residual generation process all include at least one of same data clipping process and same reference picture selection process.

The flowchart shown above is intended to illustrate an example of a three-dimensional or multi-view video coding system incorporating an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The pseudo residual prediction and DV or MV estimation methods described above can be used in a video encoder as well as in a video decoder. Embodiments of pseudo residual prediction methods according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of residual prediction in a three-dimensional (3D) or multi-view coding system, the method comprising:
   receiving input data associated with a current block of a current picture in a current dependent view;
   when a residual prediction mode is enabled and the current block is coded using uni-prediction,
      generating a residual signal for the current block based on only list 0 reference data or list 1 reference data; and
      generating a residual predictor using only the list 0 reference data or the list 1 reference data according to a first residual generation process; and
   when the residual predication mode is enabled and the current block is coded using bi-prediction,
      generating the residual signal for the current block based on both the list 0 reference data and list 1 reference data; and
      generating the residual predictor from a list 0 residual predictor and a list 1 residual predictor, wherein the list 0 residual predictor is generated using the list 0 reference data of the current block according to a second residual generation process, and the list 1 residual predictor is generated using the list 1 reference data of the current block according to a third residual generation process;
   encoding or decoding of the current block by applying the residual prediction to the residual signal of the current block using the residual predictor; and
   wherein the first residual generation process, the second residual generation process and the third residual generation process all include at least one of same data clipping process and same reference picture selection process.

2. The method of claim 1, wherein the first residual generation process, the second residual generation process and the third residual generation process all use one data clipping operation or two data clipping operations.

3. The method of claim 1, wherein the second residual generation process and the third residual generation process select same reference pictures to generate the residual signal when list 0 motion information and list 1 motion information of the current block are identical.

4. The method of claim 1,
   wherein the residual signal for the current block corresponds to a temporal residual signal between the current block and a current temporal reference block of the current block, wherein the current temporal reference block is located based on a current block location using a MV (motion vector) of the current block; and
   wherein the residual signal for the current block corresponds to an inter-view residual signal between the current block and a current inter-view reference block of the current block, wherein the current inter-view reference block is located based on the current block location and a DV (disparity vector) of the current block.

5. The method of claim 4,
   wherein the residual predictor for the temporal residual signal is generated based on a corresponding block in the reference view and the temporal reference block of the corresponding block in the reference view; and
   wherein the residual predictor for the inter-view residual signal is generated based on the temporal reference block of the current inter-view reference block in the reference view and a corresponding reference block of the temporal reference block of the current inter-view reference block.

6. The method of claim 5, wherein the corresponding block in the reference view is located based on the current block location and a derived disparity vector (DV), and the temporal reference block of the corresponding block is located based on a corresponding block location using a first scaled MV derived from the MV of the current block; and
   wherein the temporal reference block of the current inter-view reference block is located based on a current inter-view reference block location using a second scaled MV (motion vector) derived from the MV of the current inter-view reference block, and the corresponding reference block of the temporal reference block of the current inter-view reference block is located based on a first location of the temporal reference block of the current inter-view block using the DV of the current block.

7. The method of claim 6, wherein a target reference picture pointed by the first scaled MV derived from the MV of the current block or the second scaled MV derived from the current inter-view reference block is selected from a group consisting of,
   a first reference picture in list 0 reference picture list of the current picture in the current dependent view;
   the first reference picture in list 1 reference picture list of the current picture in the current dependent view;
   the first reference picture in the list 0 reference picture list of the current picture in the reference view;
   the first reference picture in the list 1 reference picture list of the current picture in the reference view; and
   any other reference picture in the list 0 or list 1 reference picture list of the current dependent view or the reference view.

8. The method of claim 5, wherein during deriving the residual predictor for the temporal residual signal, the list 0 residual predictor or the list 1 residual predictor is derived by scaling list 0 MV or list 1 MV of the current block respectively to a selected reference picture in a set of temporal reference pictures for deriving the residual prediction, wherein the selected reference picture has a smallest POC (Picture Order Count) distance compared to list 0 or list 1 reference picture of the current block respectively, and wherein the selected reference picture in list 0 or a same list as the current block is used first if more than one selected reference picture has the smallest POC distance.

9. The method of claim 8, wherein a set of temporal reference pictures for the list 0 and list 1 contains only a leading temporal reference picture in the list 0 or the list 1 respectively, or only one temporal reference picture having smallest QP (Quantization Parameter) in the list 0 or the list 1 respectively.

10. The method of claim 8, wherein when more than one selected reference picture has the smallest POC distance, the selected reference picture in the list 0, the list 1 or a same list as the current block is used first, and wherein a flag is transmitted in a sequence, view, picture, slice, CTU (coding tree unit), CU (coding unit), or PU (prediction unit) level to indicate list selection.

11. The method of claim 8, wherein when a leading temporal reference picture in the list 0 or the list 1 is not available, the leading temporal reference picture in another list is used.

12. The method of claim 5, wherein during deriving the residual predictor for the inter-view residual signal, the list 0 residual predictor or the list 1 residual predictor is derived by scaling list 0 MV of the current inter-view reference to a first temporal reference picture in list 0 reference picture list of the current picture in the reference view, wherein the list 0 residual predictor or the list 1 residual predictor is derived by scaling list 1 MV of the current inter-view reference to a first temporal reference picture in list 1 reference picture list of the current picture in the reference view if the list 0 MV of the current inter-view reference is invalid, wherein a zero MV is used, the first temporal reference picture in list 0 reference picture list of the current picture in the reference view is selected as the reference picture if both the list 0 MV and the list 1 MV are invalid.

13. The method of claim 5, wherein during deriving the residual predictor for the inter-view residual signal, the list 0 residual predictor or the list 1 residual predictor is derived by scaling list 0 MV of the current inter-view reference to a first temporal reference picture in list 0 reference picture list of the current picture in the reference view, wherein the list 0 residual predictor or the list 1 residual predictor is derived by scaling list 1 MV of the current inter-view reference to a leading temporal reference picture in list 1 reference picture list of the current picture in the reference view if the list 0 MV of the current inter-view reference is invalid, wherein a zero MV is used, a selected reference picture is determined, and the selected reference picture is valid and has a smallest POC (Picture Order Count) distance compared to list 0 reference picture or list 1 reference picture of the current block respectively if both the list 0 MV and the list 1 MV are invalid, and wherein the selected reference picture in list 0 or a same list as the current block is used first if more than one selected reference picture has the smallest POC distance.

14. The method of claim 5, wherein during deriving the residual predictor for the inter-view residual signal, the list 0 residual predictor or the list 1 residual predictor is derived by scaling list 0 MV of the current inter-view reference block to a selected reference picture in a set of temporal reference pictures for deriving the residual prediction, wherein the selected reference picture has a smallest POC (Picture Order Count) distance compared to list 0 reference picture of the current block, wherein the list 0 residual predictor or the list 1 residual predictor is derived by scaling list 1 MV of the current inter-view reference block to the selected reference picture if the list 0 MV is invalid, wherein a zero MV is used, the selected reference picture is determined, and the selected reference picture is valid and has the smallest POC (Picture Order Count) distance compared to list 0 reference picture or list 1 reference picture of the current block respectively if both the list 0 MV and the list 1 MV are invalid, and wherein the selected reference picture in list 0 or a same list as the current block is used first if more than one selected reference picture has the smallest POC distance.

15. The method of claim 5, wherein during deriving the residual predictor for the inter-view residual signal, the list 0 residual predictor or the list 1 residual predictor is derived by scaling list 0 MV of the current inter-view reference block to a selected reference picture in a set of temporal reference pictures for deriving the residual prediction, wherein the selected reference picture has a smallest POC (Picture Order Count) distance compared to the current picture, wherein the list 0 residual predictor or the list 1 residual predictor is derived by scaling list 1 MV of the current inter-view reference block to the selected reference picture if the list 0 MV is invalid, wherein a zero MV is used, the selected reference picture is determined, and the selected reference picture is valid and has the smallest POC (Picture Order Count) distance compared to the current picture if both the list 0 MV and the list 1 MV are invalid, and wherein the selected reference picture in list 0 or a same list as the current block is used first if more than one selected reference picture has the smallest POC distance.

16. An apparatus of residual prediction in a three-dimensional (3D) or multi-view coding system, the apparatus comprising one or more electronic circuits configured to:
receive input data associated with a current block of a current picture in a current dependent view;
when a residual prediction mode is enabled and the current block is coded using uni-prediction,
generate a residual signal for the current block based on only list 0 reference data or list 1 reference data; and
generate a residual predictor using only the list 0 reference data or the list 1 reference data according to a first residual generation process; and
when the residual prediction mode is enabled and the current block is coded using bi-prediction,
generate the residual signal for the current block based on both the list 0 reference data and list 1 reference data; and
generate the residual predictor from a list 0 residual predictor and a list 1 residual predictor, wherein the list 0 residual predictor is generated using the list 0 reference data of the current block according to a second residual generation process, and the list 1 residual predictor is generated using the list 1 reference data of the current block according to a third residual generation process;
encode or decode of the current block by applying the residual prediction to the residual signal of the current block using the residual predictor; and
wherein the first residual generation process, the second residual generation process and the third residual generation process all include at least one of same data clipping process and same reference picture selection process.

17. The apparatus of claim 16, wherein the first residual generation process, the second residual generation process and the third residual generation process all use one data clipping operation or two data clipping operations.

18. The apparatus of claim 16, wherein the second residual generation process and the third residual generation process select same reference pictures to generate the residual signal when list 0 motion information and list 1 motion information of the current block are identical.

19. The apparatus of claim 16,
wherein the residual signal for the current block corresponds to a temporal residual signal between the current block and a current temporal reference block of the current block, wherein the current temporal reference block is located based on a current block location using a MV (motion vector) of the current block; and
wherein the residual signal for the current block corresponds to an inter-view residual signal between the current block and a current inter-view reference block of the current block, wherein the current inter-view reference block is located based on the current block location and a DV (disparity vector) of the current block.

20. A method of residual prediction in a three-dimensional (3D) or multi-view coding system, the method comprising:
receiving input data associated with a current block of a current picture in a current dependent view;
when a residual prediction mode is enabled and the current block is coded using uni-prediction,
generating a residual signal for the current block based on only list 0 reference data or list 1 reference data; and
generating a residual predictor using only the list 0 reference data or the list 1 reference data; and
when the residual prediction mode is enabled and the current block is coded using bi-prediction,
generating the residual signal for the current block based on both the list 0 reference data and list 1 reference data; and
generating the residual predictor from a list 0 residual predictor and a list 1 residual predictor, wherein the list 0 residual predictor is generated using the list 0 reference data of the current block, and the list 1 residual predictor is generated using the list 1 reference data of the current block;
encoding or decoding of the current block by applying the residual prediction to the residual signal of the current block using the residual predictor; and
wherein an identical motion checking process is disabled for the current block when the residual prediction mode is enabled, and the identical motion checking process is performed only for blocks with the residual prediction mode disabled.

\* \* \* \* \*